Sept. 15, 1970   B. J. COSTELLO   3,529,117
SOLDERING APPARATUS
Original Filed Jan. 3, 1967   2 Sheets-Sheet 1
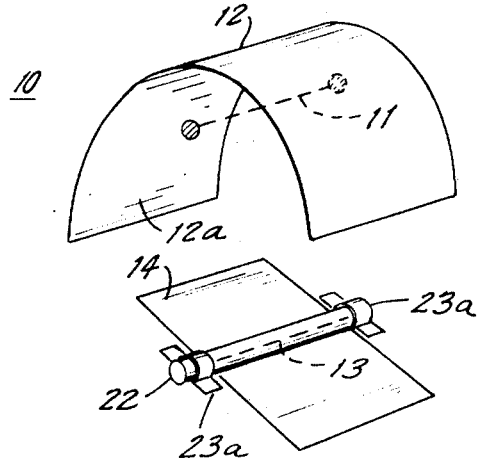
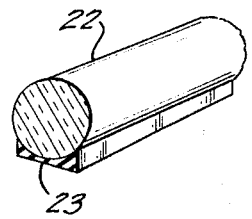
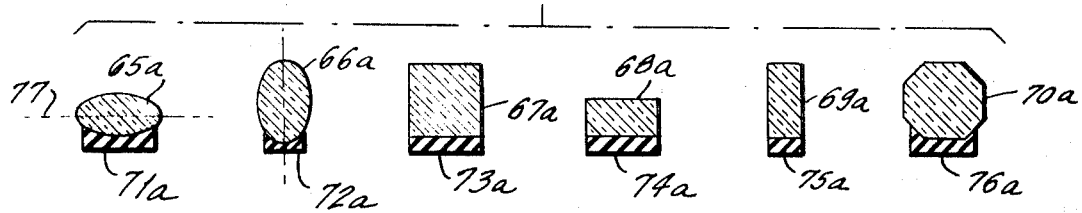
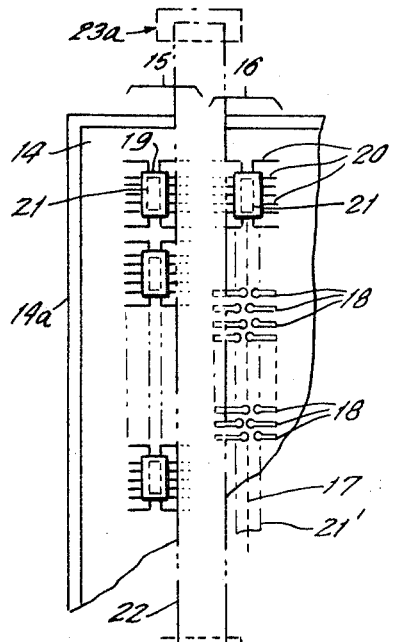
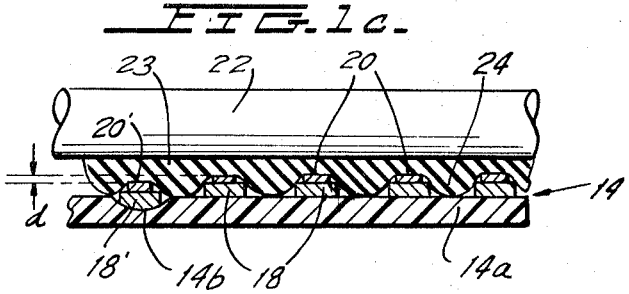
INVENTOR.
BERNARD J. COSTELLO
BY
OSTROLENK, FABER, GERB & SOFFEN
ATTORNEYS Sept. 15, 1970     B. J. COSTELLO     3,529,117
SOLDERING APPARATUS
Original Filed Jan. 3, 1967     2 Sheets-Sheet 2
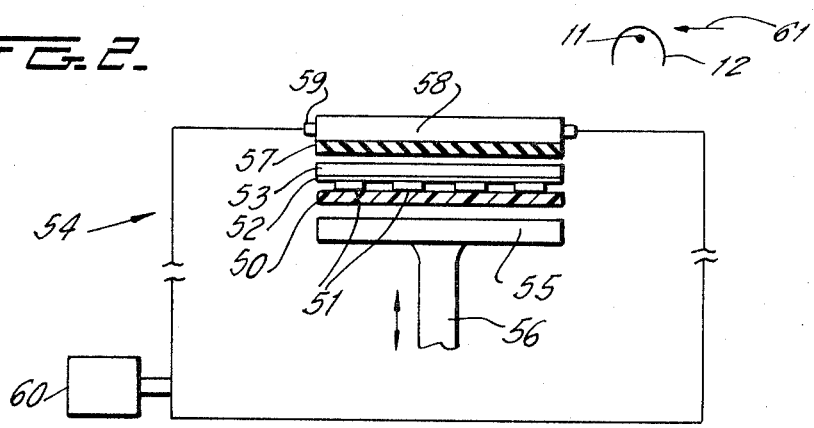
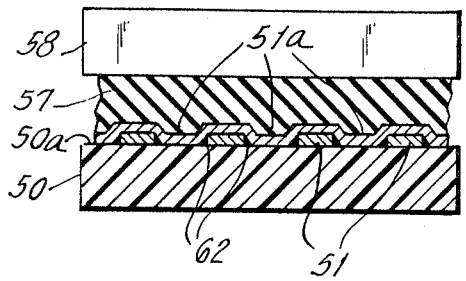
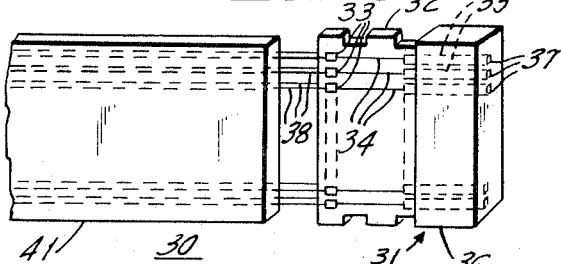
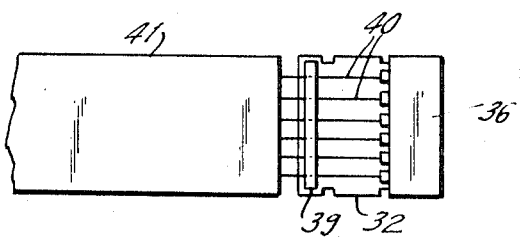
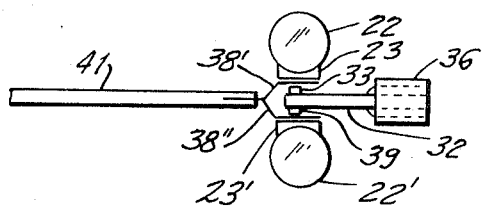
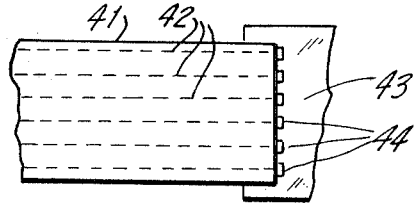
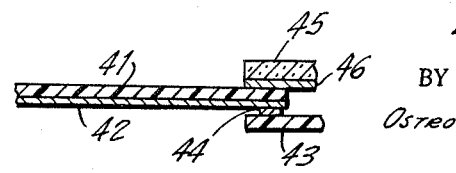
INVENTOR.
BERNARD J. COSTELLO
BY
OSTROLENK, FABER, GERB & SOFFEN
ATTORNEYS 3,529,117
SOLDERING APPARATUS
Bernard J. Costello, Ringoes, N.J., assignor to Argus Engineering Company, Inc., Hopewell, N.J.
Continuation of application Ser. No. 606,670, Jan. 3, 1967. This application Sept. 11, 1969, Ser. No. 860,158
Int. Cl. B23k 1/02
U.S. Cl. 219—85      16 Claims

ABSTRACT OF THE DISCLOSURE

This invention teaches a new method and apparatus for joining two materials together when using radiant energy as a heat source. Conventional methods require means for holding the two materials rigidly together in order to satisfactorily perform the heating operation. The conventional holding means usually absorbs a good deal of the irradiation or otherwise diverts the irradiation from the materials to be heated resulting in an ineffective seal. The instant invention provides a novel transparent holding means combined with an irradiation source emitting infrared rays, for example, which are focused upon the materials to be heated. The transparent holding means is light transmissive enabling substantially all of the rays to be concentrated upon the materials being heated thereby providing an effective joining of the two materials. In the case where one of the materials being held down has irregularities, the rigid light transmissive means may further be coated with a conventional light transmissive material which conforms to the irregularities so as to apply substantially equal holding pressure over the surface of the material containing the irregularities.

---

This application is a continuation of application Ser. No. 606,670, filed Jan. 3, 1967, now abandoned.

The instant invention relates to means for electrically and mechanically joining conductive members and more particularly to novel apparatus for combining into a unitary device means for rigidly holding down a multiplicity of conductive members and simultaneously therewith for concentrating radiation upon the members to be joined to effect an excellent solder joint.

When two or more members are desired to be joined together it is normally required that some means be provided to hold such members in intimate contact with one another during the joining operation which may be a welding, brazing, soldering, adhesive curing, glass melting, plastic melting, or any other like joining operation which requires heat as a catalyst.

Some recently developed techniques employ focused radiant heating as the source of applying thermal energy to the members to be joined. With the use of such a technique one is confronted with the rather troublesome problem of providing a holding mechanism that will not interfere with the radiation path between the heat source and the area that is to be heated and as well, that will not remove significant portions of the heat by drawing it away from the members being heated. No suitable techniques have yet been developed to overcome this problem.

The instant invention is characterized by providing a technique which not only provides suitable means for rigidly holding such members to be joined into intimate contact and which does not draw any significant amount of radiation away from the members to be heated, but which further provides the added function of concentrating the radiant energy upon those definite areas which are required to be heated to the exclusion of those areas in which no heating is desired.

The instant invention provides a method of overcoming the problem through construction of a holding mechanism of a material that is substantially transmissive to radiant energy. The radiation will thus be transmitted with minimum attenuation and thereby be available to heat the desired area.

The apparatus is comprised of a suitable infrared energy source and reflective means for focusing the energy source either at a point, or along a line. In the case where it is desired to bond a plurality of electronic components of miniature or even micro-miniature dimensions to a printed circuit board having a multiplicity of leads, the bonding material such as, for example, solder, is applied to the miniature circuits which are often referred to as integrated circuits, or as flat-packs, as well as being applied to the multiplicity of leads upon the printed circuit board.

Each of the flat-packs are then accurately positioned upon the circuit board so that the leads thereof overlie associated leads of the printed circuit board. Temporary holding means such as, for example, adhesive tape, coated on both sides thereof may be employed for temporarily securing the flat-packs in the desired alignment.

The light transmissive member is then positioned upon the flat-pack leads and, through the use of a suitable jig or other securing member is caused to bear down with some suitable pressure upon the flat-pack leads. The assembly is then positioned within the field of focus of the radiation device and is exposed to the radiation for a predetermined period of time. The infrared rays are focused so as to pass the light transmissive member which is formed of a rigid material such as quartz, Pyrex, sapphire or any other suitable material. The rod may have a cylindrical cross-section and acts to concentrate the infrared rays upon the specific region of contact between flat-pack leads and printed circuit leads and thereby provide and excellent solder bond therebetween. The rigidity of the light transmissive rod assures application of good contact force against the leads being bonded so as to place associated conductive leads into good intimate contact.

In the case where the printed circuit board has surface irregularities due to limitations in manufacturing processes or further in the case of irregularities in the contact leads of the flat-pack or of both devices it is preferred that a rigid light transmissive holding member be provided which will conform to the surface being heated so as to assure substantially uniform contact pressure and thereby avoid the possibility that those contacts located within the region of an irregularity will not be suitably bonded. This problem may be overcome by forming or otherwise depositing a light transmissive rubberized and hence conformal material along the length of the rigid light transmissive member which rubberized or resilient material will maintain contact pressure along the length of the rigid light transmissive rod at a substantially uniform value so as to compensate for any irregularities in the elements being bonded and thereby provide an excellent bond between engaging conductive leads.

Whereas the bonding apparatus described is extremely advantageous for use in joining a flat-pack or other electronic components to printed circuit boards the above techniques have also been found to be extremely advantageous for use in bonding conductive leads to one another, which conductive leads assume a variety of forms such as flexible printed circuits, terminal connectors, spaced parallel conductive members imbedded in substantially flat plastic sheets, as well as any other forms of circuitry. The above apparatus is not limited to applications of bonding to provide electrical contact paths but may further be employed for the purpose of bonding conformal plastic materials to printed circuit boards and the like. All of the above techniques will be described in greater detail hereinbelow.

It is therefore one object of the instant invention to provide a novel method and apparatus for bonding materials through the use of infrared radiation.

Another object of the instant invention is to provide a novel method and apparatus for bonding conductive leads to associated conductive terminals through infrared radiation wherein novel means are provided for maintaining associated leads being bonded to one another in intimate surface contact while at the same time permitting the infrared radiation to impinge upon the leads being bonded with substantially no loss in radiation intensity due to the presence of the holding means.

Still another object of the instant invention is to provide a novel method and apparatus for bonding conductive leads to associated conductive terminals through infrared radiation wherein novel means are provided for maintaining associated leads being bonded to one another in intimate surface contact while at the same time permitting the infrared radiation to impinge upon the leads being bonded with substantially no loss in radiation intensity due to the presence of the holding means and wherein further means is provided for fully compensating for any irregularities in the elements being bonded so as to assure intimate contact holding pressure during the bonding operation and thereby provide an excellent bond between the elements being joined.

These and other objects of the instant invention will become apparent when reading the accompanying description and drawings in which:

FIG. 1 is a perspective view showing apparatus for performing the novel method of the instant invention.

FIG. 1a is a top plan view showing the light transmissive holding means of FIG. 1 in greater detail.

FIG. 1b is a perspective view of the light transmissive holding means which may be employed in the apparatus of FIG. 1.

FIG. 1c is an end view of a work piece and light transmissive holding means which may be employed in the apparatus of FIG. 1.

FIG. 2 shows a sectional view of another bonding apparatus employing the principles of the instant invention.

FIG. 2a is an end view showing the light transmissive holding meeans and work piece in greater detail.

FIG. 3a is a top view showing another bonding application of the instant invention.

FIG. 3b and 3c are bottom plan and end views, respectively, of the circuit components shown in FIG. 3a.

FIG. 4a and 4b are top and end views respectively, showing another bonding application of the instant invention.

FIG. 5 is a cross sectional view of a plurality of light transmissive members.

Referring now to the drawings, FIG. 1 shows a bonding apparatus 10 which is comprised of an infrared-heat source 11 which may, for example, be a quartz-iodine lamp capable of generating infrared radiation at temperatures of the order of 3400° K. or more. Lamp 11 is positioned at the focal point of a polished elliptical-cylindrical reflector 12 whose internal surface 12a is designed to reflect the infrared rays into a substantially straight line focal zone 13. The internal surface or concave surface 12a may be a polished gold surface but any other suitable polished surface may be employed, depending only upon the needs of the user. Suitable radiation apparatus which may be employed is presently being manufactured by the Argus Engineering Company and is identified by the name Conray Line Heater. However, it should be noted that any other suitable radiation apparrtus may be employed, depending only upon the needs of the user.

The focal zone 13 obtained by the Conray Line Heater referred to above, has a length of approximately 6" and a width of approximately 0.10". However, it is obvious that the equipment may be modified to vary the length and width of the focal zone 13 depending upon the particular application involved.

As a first application of the apparatus shown in FIG. 1, let it be assumed that it is desired to secure the conductive leads of a plurality of integrated circuits to associated conductive leads provided on a printed circuit board. FIG. 1a shows such an application in detail. As is shown therein, there is provided a printed circuit board 14 typically comprised of an insulating substrate 14a and having a printed circuit pattern thereon which may be formed by any of the photo etching processes conventionally employed in the printed circuit board field. In the embodiment of FIG. 1a, only a portion of the printed circuit board 14 is shown therein for purposes of simplicity, it being understood that the printed circuit board may have any number of columns of conductive leads with the columns being of any desirable length. FIG. 1a shows a portion of two such columns 15 and 16, respectively. The lower portion of column 16 shown in FIG. 1a is provided with a plurality of conductive leads arranged in first and second column groups with the first column group lying to the left of the center line 17 and with the second column group of conductive leads lying to the right of center line 17.

Let it now be assumed that a plurality of integrated circuits 19, commonly referred to as flat-packs are to be bonded (i.e., soldered) to associated conductive leads of the printed circuit board 14. Each of the flat-packs 19 houses within the interior thereof some form of an integrated circuit and has protruding therefrom a plurality of leads 20 for connection to the leads of some external circuit or, in the case of the instant application to the leads of a printed circuit board.

Since the leads 20 of the flat-packs 19 are quite small and rather closely spaced and likewise since the leads 18 of the printed circuit board 14 are quite small and rather closely spaced, it is important that the flat packs be accurately positioned with their leads 20 properly aligned immediately above the associated conductive leads 18 of the printed circuit board. This may be simply and readily carried out by providing a small piece or strip of adhesive tape 21 (shown in dotted fashion) or other suitable material having an adhesive coating on both surfaces thereof so that one surface may be applied to the underside of a flat-pack 19 and then the flat-pack may be positioned with its conductive leads immediately above the associated conductive leads 18 of the printed circuit board and momentarily pressed against the printed circuit board so as to enable the remaining exposed adhesive coated surface to adhere to the printed circuit board. It should be noted that the presence of the small adhesive strip in no way effects the successful operation of the flat-packs so that these strips may remain permanently beneath the flat-packs without any concern for their presence.

Present day techniques for joining the conductive leads 20 of the flat-packs to the conductive leads 18 of the printed circuit board employ very fine needle point soldering irons to provide the joint. Such techniques are extremely tedious and time consuming and the reject rate of completed circuit boards employing the technique is rather high. Through the use of the infrared radiation method of the instant invention a much faster and more successful bonding technique is provided which cuts down on assembly time and which provides a significantly lower rejection rate.

In order to perform the soldering operation the preferred procedure is to apply solder to the flat-pack leads 20 prior to adhering the flat-pack to the printed circuit board by dipping the leads 19 into a molten bath or pot of solder. The conductive leads of the printed circuit board are prepared by an electro-deposition procedure using the proper solder alloy which is applied to the appropriate land areas on the board such as each of the left and right-hand groups of the conductive lead columns 15 and 16, for example. Using this procedure, each conductive lead is thus coated with a uniform and controllable layer of solder. The electro-deposition process may lay down discrete regions of solder directly upon each of the conductive leads 18 or alternatively, a solder cream may be put down in the form of an elongated continuous strip of solder which, obviously, bridges the region between conductive leads. The fact that such a continuous strip can be said to short-circuit all of the leads is of no concern for reasons to be more fully described.

After the leads 20 and 18 of the flat-packs 19 and printed circuit board 14, respectively, have been suitably coated with solder, the flat-packs may then be positioned in the manner previously described so that their leads 20 are in proper alignment with associated leads 18 (of each of the left and right-hand groups of leads in each column), with the double side adhesive tape strips 21 maintaining the desired alignment. Whereas separate strips 21 of the double side adhesive may be individually applied to each flat-pack an alternative method which may be employed is that of laying down an elongated continuous strip 21' such as that shown overlying column 16, so that one piece of coating adheres to the surface of the printed circuit board. The individual flat-packs may then be appropriately positioned and once properly aligned may then be pressed downwardly with a suitable amount of force so as to be retained by the other adhesive coated surface in the position of proper alignment.

While the adhesive strip 21 (or 21') may be said to secure the housing of each flat-pack to the printed circuit board, some means must now be provided for urging the leads 20 of each flat-pack into intimate engagement with the associated leads 18 of the printed circuit board. In the example of FIG. 1a, this is accomplished through the use of a light transmissive rod-shaped member 22 which may, for example, be a quartz, Pyrex or sapphire rod having a substantially high rigidity characteristic so that it is effectively incapable of being deformed or bent to a significant degree. The light transmissive rigid rod 22 is positioned so as to be substantially parallel to the columns 15 and 16 and so as to overlie the leads 20 extending toward the right from flat-packs 19 arranged in column 15 as well as overlying the leads 20 extending toward the left from the flat-packs 19 arranged in column 16. Whereas columns 15 and 16, as shown, do not show a multiplicity of flat-packs in each column, it should be understood that as few as one and as many as that amount which would occupy every position within a column may be arranged in each column. Obviously, optimum use of the bonding technique is obtained when each column is filled or nearly filled with flat-pack devices.

In order to assure intimate contact between flat-pack leads 20 and their associated printed circuit board leads 18, the light transmissive rigid rod 22 is held down by suitable jigs 23a at opposite ends thereof so as to forcefully urge the leads into intimate engagement. The jig means has been shown only in block diagram form, it being understood that any type of adjustable holding means may be applied which is capable of maintaining the rod 22 in appropriate alignment and urged into forceful contact with the leads 20.

The assembly of FIG. 1a is then positioned beneath the radiation source in the manner shown in FIG. 1 with the rod 22 lying immediately above the focal zone 13. Details of the printed circuit board as shown in FIG. 1a have been omitted from the arrangement of FIG. 1 for purposes of simplicity. Also, it should be understood that the jig means 23a and 23b may be arranged upon the working surface beneath the radiation source so as to facilitate alignment of the assembly to be soldered within the focal zone 13. With all elements now properly aligned, the radiation source 11 is energized and retained in the energized state for a predetermined time period sufficient for bonding the associated leads 18 and 20 of the printed circuit board 14 and the flat-packs 19, respectively.

The radiation source 11 remains ON for a period sufficient to assure a good bond between the associated members, while at the same time preventing any damage due to the thermal energy present to befall the electronic circuitry within each flat-pack. The light transmissive rod 22 acts to concentrate the radiant infrared energy to both the left-hand and right-hand groups of leads in columns 16 and 15, for example, thereby completing the bonding operation for half of the flat-packs 19 in each of the columns 15 and 16 during a single radiation process. With the use of the light transmissive rod the width of the focal zone 13, while being substantially incapable of measurement is nevertheless found to be sufficient for soldering all of the leads beneath the rod 22 from the flat-packs arranged in both of the columns 15 and 16. After a suitable period of irradiation the radiation source 11 may be turned OFF either manually or automatically by a timer. The jigs 23a and 23b may then be operated to allow dismantling of the assembly thereby completing the bonding process.

As was mentioned previously, the solder may be laid upon the printed circuit board conductive land areas by an electro-deposition process or a solder cream may be put down so as to form a continuous elongated solder strip. In the latter case, during the irradiation phase, the conductive leads 20 of the flat-packs 19 are found to absorb the greatest amount of radiant energy thereby causing the solder laid upon the printed circuit board and which is positioned between adjacent leads to be drawn from the intermediate region toward the leads and to "wick" under the leads 20 thereby providing additional solder for the formation of the bond as well as removing all of the solder in the intermediate region between adjacent leads 18. Thus, when the irradiation procedure is completed, no solder will be found to remain in the region between conductive leads 18 and hence no short-circuiting paths will be present. In the electrodeposition case the "wicking" phenomenon is not as important since the solder does not normally bridge across two or more contacts.

When soldering assemblies of the type shown in FIG. 1a, consideration must be given to the possible existance of irregularities in the printed circuit board surface or irregularities in the thicknesses of the leads 18 and 20, any of which irregularities may be present either alone or in combination so as to prevent the rigid light transmissive rod 22 from bearing down upon all of the leads 20 with a substantially uniform amount of force. Considering FIG. 1c, for example, there is shown therein an end view of a printed circuit board 14 having an insulating substrate 14a with an irregularity at the location 14b causing the conductive lead 18' provided on the printed circuit board 14 and the lead 20' of one flat-pack 19 (not shown) to achieve a height which is lower by a distance $d$ than the height of the remaining leads 18 having other flat-pack leads 20 positioned thereon. Assuming that additional lead combinations 18-20 lie to the left of the lead combination 18'-20', the rigid light transmissive rod 22 will be unable to apply a holding force upon the combination 18'-20'. Whereas only one type of irregularity is shown herein, it should be understood that another type of irregularity which may exist is an irregularity in the thickness of leads 18 or 20 or a combination thereof so as to result in a problem similar to that shown in FIG. 1c.

In order to correct for such irregularities, one portion of the surface of rigid light transmissive rod 22 may be coated with a light transmissive conformal material 23 in the manner shown in FIG. 1b. One suitable material which may be employed is clear silicone rubber which is available in various hardness grades and which can be readily joined or cast to the rigid light transmissive member 22. Since the clear silicone rubber or other suitable material is also substantially radiation transmissive, it permits the infrared energy to pass therethrough with minimum attenuation. FIG. 1c shows a rigid light transmissive rod 22 having a light transmissive conformal coating 23. When the rod 22 is forcefully urged against printed circuit board 14 the resilient material 23 conforms to the irregular outline presented by the printed circuit board 14 and the leads 18 and 20 so as to assure substantially uniform contact pressure will be applied to all of the lead combinations 18–20, as well as the lead combination 18′–20′ and thereby assure a good solder bonding therebetween. It should be noted that the end view of FIG. 1c has been grossly exaggerated dimensionally in order to better appreciate the characteristics of the light transmissive holding means. The solder coatings provided upon leads 18 and 20 (as well as 18′ and 20′) have been omitted, but it should be understood that these leads will be coated with solder either by the process mentioned above or any other suitable process.

In addition to the uniform contact pressure function performed by the conformal material 23, an additional advantage which is obtained is that the conformal material deforms in the region between adjacent contacts 18 as shown at 24 so as to bear down upon the insulating surface of the substrate 14a. If the printed circuit board has solder cream deposited thereupon in elongated continuous strips, as the solder in the region between adjacent contacts 18 melts, the conformal material 23 will be pressed downwardly in those regions so as to more rapidly urge the solder in these regions to disperse in opposite directions toward the adjacent leads to the left and to the right of the solder, thereby further facilitating the "wicking" of the solder in these regions in the region between the lead combinations 18–20 thereby more rapidly moving the solder toward and between the leads to be bonded.

FIGS. 3a–3c show another electrical assembly in which the soldering method of the instant invention may be advantageously employed. The assembly 30, shown therein, is comprised of an end connector 31 further consisting of a printed circuit board section 32 having a plurality of solder pads 33 arranged at spaced intervals toward the left-hand edge of the board 32. These solder pads are connected through a printed circuit pattern represented by the leads 34 to metallic connecting means 35 imbedded within an insulating member 36 which is provided at its right-hand end with a plurality of openings 37 arranged in a predetermined array and designed to receive a male connecting member (not shown) having a plurality of prongs arranged in an array similar to that of the array of openings 37 so as to provide electrical contact between the prongs (not shown) and the conductive terminals 35. The solder pads 33 are designed to be bonded to a plurality of relatively thin conductors 38, selected ones of which are connected to the solder pads 33 and the remaining ones of which are connected to an elongated solder pad 39 provided on the reverse side of the printed circuit board 32. The solder pad 39 may be electrically connected to selected ones of the end terminals 35 through a second printed circuit pattern provided on board 32 as typified by the printed circuit leads 40. In one embodiment alternate ones of the leads 38 are connected to the individual solder pads 33 whereas the intermediate leads interposed between the alternate group of leads are connected to the continuous elongated solder pad 39. FIG. 3c shows an end view of the assembly with one lead 38 being bent in the manner shown so as to make contact with a solder pad 33 and with a second lead 38″ being bent in the manner shown so as to make contact with the elongated solder pad 39. All of the thin conductors 38 are shown to be arranged in spaced parallel fashion and imbedded in a substantially tape-like strip of plastic material 41 which has been "skinned" at one end thereof so as to "bare" the leads 38.

The bonding process may be performed in the same manner as was previously described wherein one group of selected leads is appropriately positioned upon the solder pads 33 and then maintained into the surface contact by means of a rigid light transmissive rod 22 having a conformal coating 23 thereon so as to compensate for any irregularities which may exist in the printed circuit board 32 or conductive leads 38, or both. The transmissive rod 22 is held down in rigid fashion in the same manner as was previously described and, when positioned to lie immediately above the focal plane (13 shown in FIG. 1) may now be irradiated in the same manner as was previously described.

The remaining leads which are to be connected to the continuous elongated solder pad 39 may now be soldered in a similar manner. It should be understood that, if desired, simultaneous soldering of both sides may be performed by providing a second light transmissive rod 22′ having a conformal coating 23′ may be clamped together with the light transmissive holding assembly 22–23 and be irradiated simultaneously by positioning separate radiation sources on both sides of the assembly to be joined and irradiating simultaneously. This may be done with the assembly to be joined being held in either a horizontal or a vertical plane.

FIGS. 4a and 4b show still another application of the bonding method of the instant invention wherein it may be desired to bond flexible circuitry to either flexible or rigid terminals. As shown in FIGS. 4a and 4b there is provided an elongated tape-like assembly 41 having a plurality of conductive leads or strips 42 which are formed by laminating thin plastic film to copper foil and then selectively etching away the copper through a suitable photo-etching process to form the desired circuit pattern. In attaching this type of a circuit assembly to a rigid circuit board (or even to another flexible circuit board) it is necessary to form a lap-type joint with the exposed metallic leads of the flexible circuit being pressed against the exposed metal on the rigid board. This presents an insurmountable problem when considering the use of conventional techniques since a portion of the flexible circuit that is available for heat application is covered by a layer of plastic film. The plastic film cannot be stripped from the back side of the copper strips because the copper strips formed through the photoetching process are extremely thin and have substantially no stability in the absence of the plastic backing.

Therefore in heating the flexible circuitry for bonding purposes under the above circumstances it is necessary to transmit energy through the plastic backing without causing it to overheat and become damaged. Radiant heating is particularly well suited for this type of operation since the plastic backing film of the flexible printed circuit is typically light transmissive and energy will thereby be absorbed only in the conductive strips and the opposing surface to which the circuit is being joined. As shown in FIG. 4a the plastic backing 41 has a printed circuit pattern 42 comprised of elongated strips arranged in a substantially spaced parallel fashion. The plastic strip 41 is arranged so as to form a lap joint over a substantially rigid printed circuit board 43 having a plurality of conductive terminals 44. The surface of the plastic backing containing the strips 42 is pressed against the printed circuit pattern 44 in the manner which can best be seen in FIG. 4b. A rigid light transmissive member 45 having a conformal material 46 provided on one surface thereof is rigidly clamped into place in any of the manners previously described so as to assure intimate surface contact between the printed circuit patterns 42 and 44 of the strip 41 and board 43, respectively. The radiation phase may then be performed in the same manner as was previously described.

It is preferred that the silicone conformal surface 46 be employed in this particular application to compensate for variations in the rigid member and to provide pressure between the conductor strips, thus preventing electrical bridging between closely spaced patterns so as to yield the same "compartmentalizing" effect as depicted in FIG. 1c. Due to the light transmissive characteristics of the film backing 41 which lies within the radiation path of the source 11 (see FIG. 1) the substantially major portion of radiant energy is absorbed by the conductive strips 42 so as to provide an extremely good solder bond without causing the film backing 41 to be warped, burned, or otherwise damaged during the irradiation phase. The deposition of solder upon the conductive foil strips 42 and the terminals 44 may be performed in any of the manners previously described.

FIGS. 2 and 2a show still another application of the method of the instant invention. These figures show a printed circuit board 50 having a printed circuit pattern comprised of a plurality of conductive leads 51. The pattern may be any suitable pattern, depending upon the particular application involved. It is desired to provide a conformal coating of the printed circuit card, which conformal coating covers the entire surface of the card including the insulating surface as well as the conductive lead pattern. As can clearly be seen from a consideration of FIGS. 2 and 2a, the film to be coated upon the surface is presented with an irregularly shaped surface contour due to the elevated positions of the printed circuit pattern relative to the top surface 50a of the insulating subtrate 50. In one application, it was found that the conductive strips 51 are elevated by an amount of the order of 0.002″ above the surrounding areas. In spite of this irregular contour, it is an absolute requirement that the conformal film be pressed intimately upon all surfaces whether horizontally or vertically aligned, with equal pressure and after joining no voids may exist in the transition zones between areas of different elevation. In order to meet the rather rigid requirements of the above identified application, the film 53 which is to be conformally coated to the surface of the printed circuit board is coated with a suitable adhesive material 52 which preferably has characteristics suitable to cause the conformal material to adhere to the printed circuit card surface to facilitate the handling and heating operations. The conformal film may, for example, be Mylar or any other similar plastic film having an adhesive coating on one surface thereof. Alteratively, if desired, the adhesive coating may be applied directly to the surface of the printed circuit board, however, the preferred method is to provide the conformal film 53 with the adhesive coating.

The printed circuit board 50 is then positioned upon one surface of a platen 55 contained within a hermetically sealed housing 54. The platen 55 is reciprocally moved by a plunger 56 secured to any suitable manual or automatic driving means (not shown) which may be contained within the hermetically sealed housing 54 or conversely which may be exterior of housing 54 and communicate therewith through a plunger extending through the opening and having a hermetic seal surrounding the plunger so as to communicate with the plunger poriton 56 coupler to platen 55.

The Mylar or other plastic film 53 having an adhesive coating 52 is positioned upon the printed circuit board 50 and is urged into intimate contact with a resilient conformal coating 57 provided on a substantially flat rigid sheet 58 which is formed of a suitable light transmissive material. The periphery of sheet 58 is hermetically bonded at 59 within an opening provided in hermetically sealed housing 54.

The enclosure 54 may be further provided with a suitable lid, door or other opening for inserting the elements 50–53, which opening may then be hermetically sealed. The interior region of the housing 54 may then be evacuated by a suitable vacuum pump means 60. Either before or after the desired vacuum level is achieved the plunger 56 is moved vertically upward so as to cause the adhesive 52 to be urged into intimate contact with the entire exposure surface of the printed circuit board 50, as well as the conductive lead pattern 51.

The irradiation phase of the operation is performed by providing an irradiation source 11 and reflector 12 above the rigid light transmissive sheet 58. The radiation source 11 is energized and moved at a predetermined rate of travel in a direction shown by the arrow 61 so as to scan and hence irradiate the entire surface of the plastic sheet 53 which overlays the printed circuit board.

As the plastic film 53, the adhesive 52, the conductive lead 51 and the printed circuit board 50 become heated, the adhesive material and the plastic film become extremely pliable allowing the conformal material (which may, for example, be light transmissive silicone rubber) to be urged downwardly in the regions 51a intermediate the conductive leads 51 so as to cause the plastic film to be urged into the corners formed between the vertical sides of the conductive leads 51 and the horizontal upward surface 50a of the printed circuit board 50. Whereas the plastic film will not assume a sharp right-angle configuration in these corner regions the adsesive material will nevertheless be captured in these corner regions 62 so as to prevent any voids whatsoever to be contained within the regions captured within the plastic sheet 52 and the irregular surface of the printed circuit board 50. This objective is fully achieved by the conformal material 57 which presses downwardly upon the plastic film to cause the plastic film, in turn, to be pressed intimately against all surfaces of the printed circuit board with equal pressure so as to avoid the forming of any voids within the transition zones between areas of different elevation.

Whereas FIGS. 2 and 4b show the use of a substantially flat sheet of a rigid light transmissive member and whereas FIGS. 1a–1c and 3c show the use of a rod-shaped member, it should be understood that any other suitable cross-sectional configuration may be employed. For example, FIG. 5 shows a plurality of cross-sectional shapes of the rigid light transmissive member which may be employed. The member may have an ellipsoidal cross-section, as shown by the embodiment 65a and 66a; a square cross-section, as shown by the embodiment 67a; a rectangular cross-section, as shown by the embodiments 68a and 79a; and a polygonal (i.e., six-sided) cross-section, as shown by the embodiment 70a. In the ellipsoidal embodiment 65a and 66a the rod may be intimately pressed into the members to be bonded with the major diameter of the ellipse being arranged in either the horizontal plane 77 or the vertical plane 78. If conformal material is employed due to irregularities in the elements being bonded, the conformal material may be applied as shown at 71a or as shown at 72a when the rod is arranged with the major diameter in the horizontal plane or the vertical plane, respectively.

In the case of the square-shaped cross-section, the conformal material may be applied as shown at 73a. In the case of a rectangular cross-sectional rod, the conformal material may be applied along the surface having the long dimension, as shown at 74a, or along the surface having the short dimension, as shown at 75a. In the case of a polygonal cross-sectional rod, the conformal material may be applied in the manner shown at 76a. Other obvious configurations may be employed without departing from the spirit of the instant invention.

It can therefore be seen from the foregoing description that the instant invention provides a novel irradiation method using a light transmissive rigid holding member which permits a multiplicity of leads of relatively minute size to be bonded (i.e., soldered) in large groups wherein the holding member assures rigid intimate contact between the elements to be bonded either in and of itself or through the medium of a conformal coating such that the light transmissive holding means allows substantially all of the radiant energy to impinge upon the components being bonded. The method is also applicable to printed circuit board conformal coating techniques wherein the use of the conformal light transmissive material assures the conformal coating of printed circuit boards and the like and completely avoids the possibility of forming any voids between the conformal plastic film and the surface being coated.

I claim:

1. Means for bonding, by infrared radiation, selected regions of first and second members arranged in a predetermined manner with the surfaces of said selected regions thereof being in surface contact;
holding means for maintaining said predetermined arrangement and for urging said selected regions into intimate contact;
said holding means being positioned above said aligned selected regions;
infrared radiation means including a radiation source and means for focusing rays emanating from said source into a zone substantially encompassing said aligned selected regions;
said holding means being a rigid light transmissive member passing said rays therethrough to said focal zone with relatively insignificant attenuation
the surface of said light transmissive member which engages the members to be joined being provided with a resilient light transmissive layer adapted to conform to the configuration of the members in contact with said resilient layer.

2. The bonding device of claim 1 wherein said rigid light transmissive member is formed of a material taken from the group consisting of quartz, sapphire, Pyrex.

3. A method for bonding two conductive leads comprising the steps of:
coating each of said leads with a predetermined amount of solder;
positioning the surfaces of said leads to be bonded into surface contact;
rigidly holding said leads into intimate engagement with one another with a light transmissive member having a resilient contact surface urged against said contacts to conform to the configuration of at least one of the leads being held thereby;
focusing infrared rays upon said light transmissive member to pass therethrough for irradiation of said engaged leads, the energy of said rays being sufficient to melt the solder so as to form a good bond between said leads.

4. Means for bonding, by infrared radiation, selected regions of first and second members arranged in a predetermined manner with the surfaces of said selected regions thereof being in surface contact;
holding means for maintaining said predetermined arrangement and for urging said selected regions into intimate contact;
said holding means being positioned above said aligned selected regions;
infrared radiation means including a radiation source and means for focusing rays emanating from said source into a zone substantially encompassing said aligned selected regions;
said holding means being a rigid light transmissive member passing said rays therethrough to said focal zone with relatively insignificant attenuation;
a layer of conformal light transmissive material being coated on one portion of said rigid light transmissive member for engaging one surface of at least one of said members being bonded to compensate for irregularities in the surfaces of said members being bonded while urging said members into firm engagement with one another.

5. The boding means of claim 4 further comprising means for rigidly holding said rigid light transmissive member into firm engagement with said members being bonded.

6. Means for bonding, by infrared radiation, selected regions of first and second members arranged in a predetermined manner with the surfaces of said selected regions thereof being in surface contact;
holding means for maintaining said predetermined arrangement and for urging said selected regions into intimate contact;
said holding means being positioned above said aligned selected regions;
infrared radiation means including a radiation source and means for focusing rays emanating from said source into a zone substantially encompassing said aligned selected regions;
said holding means being a rigid light transmissive member passing said rays therethrough to said focal zone with relatively insignificant attenuation;
one of said members being joined being a printed circuit board having a first plurality of conductive leads comprising said printed circuit pattern arranged in said selected region;
the other of said members comprising means having a second plurality of conductive leads extending therefrom and each being aligned for surface contact with an associated one of said first plurality of conductive leads;
said holding means engaging and urging said second plurality of conductive leads into intimate surface contact with said first plurality of conductive leads.;
a layer of conformal light transmissive material being coated on one portion of said rigid light transmissive member for engaging one surface of at least one of said members being bonded to compensate for irregularities in the surfaces of said members being bonded while urging said members into firm engagement with one another.

7. The bonding device of claim 6 wherein said conformal light transmissive material is silicone rubber.

8. The bonding device of claim 4 further comprising housing means for enclosing said members being bonded;
said rigid light transmissive member being a substantially flat sheet mounted within an opening in said housing;
a movable platen supporting one of said members being joined;
means for urging said platen toward said rigid light transmissive member to provide intimate contact engagement between said members being joined;
means for causing said radiation means to scan said regions to be joined to effect a suitable bond.

9. The bonding device of claim 8 wherein said members being joined are a printed circuit board and thin sheet of plastic film having an adhesive coating.

10. Means for joining selected regions of first and second members arranged in a predetermined manner with the surfaces of said selected regions being in surface contact comprising:
rigid holding means for maintaining said predetermined arrangement and for urging said selected regions into intimate contact;
an energy source positioned to transmit energy to said holding means;
said rigid holding means being adapted to transmit energy from said energy source to said members being joined;
a layer of conformal energy transmissive material interposed between said members and said holding means and engaging the surface of at least one of said members being joined to transmit the energy from said rigid holding means to the members being joined and to compensate for the irregularities in the surfaces of the members being bonded.

11. The apparatus of claim 10, wherein said energy source is comprised of means for generating energy to the members being joined, through said rigid holding member and said conformal material.

12. The apparatus of claim 10, wherein said rigid holding member is comprised of a rigid energy transmissive material having a substantially flat surface positioned adjacent the members being joined;

said layer of conformal material being positioned upon said flat surface.

13. A method for joining two conductive members comprising the steps of:

positioning the surfaces of the leads to be joined in surface contact;

holding said members into intimate engagement with one another with a rigid energy transmissive member having a resilient energy transmissive layer urged against at least one of said members to conform to the configuration of the engaged member;

supplying energy from an energy source to said rigid energy transmissive member for transferring the energy from said rigid energy transmissive member and said resilient energy transmissive member to the members being joined.

14. Means for joining a first plurality of conductive members arranged at spaced intervals to a second plurality of conductive members arranged at similarly spaced intervals and being aligned for engagement with associated ones of said first plurality of conductive members comprising:

rigid holding means for maintaining said predetermined arrangement and for urging said engaged members of said first and second groups into intimate contact;

an energy source positioned to transmit energy to said holding means;

said rigid holding means being adapted to transmit energy from said energy source to said members being joined;

a layer of conformal energy transmissive material interposed between said members and said holding means and engaging the surface of at least one of said groups of members being joined to transmit the energy from said rigid holding means to the members being joined and to compensate for the irregularities in the surfaces and sizes of the members being joined.

15. The apparatus of claim 14, wherein said energy source is comprised of means for generating energy which is conducted to the members being joined through said rigid holding member and said conformal material.

16. The apparatus of claim 14, wherein said rigid holding member is comprised of a rigid energy transmissive material having a substantially flat surface positioned adjacent the members being joined;

said layer of conformal material being positioned upon said flat surface.

References Cited

UNITED STATES PATENTS

| | | |
|---|---|---|
| 2,443,004 | 6/1948 | Horwitz. |
| 3,283,124 | 11/1966 | Kawecki _____ 219—85 X |
| 3,374,531 | 3/1968 | Bruce _____ 219—85 X |

JOSEPH V. TRUHE, Primary Examiner

L. A. SCHUTZMAN, Assistant Examiner

U.S. Cl. X.R.

219—347; 250—42; 350—190